Patented June 20, 1939

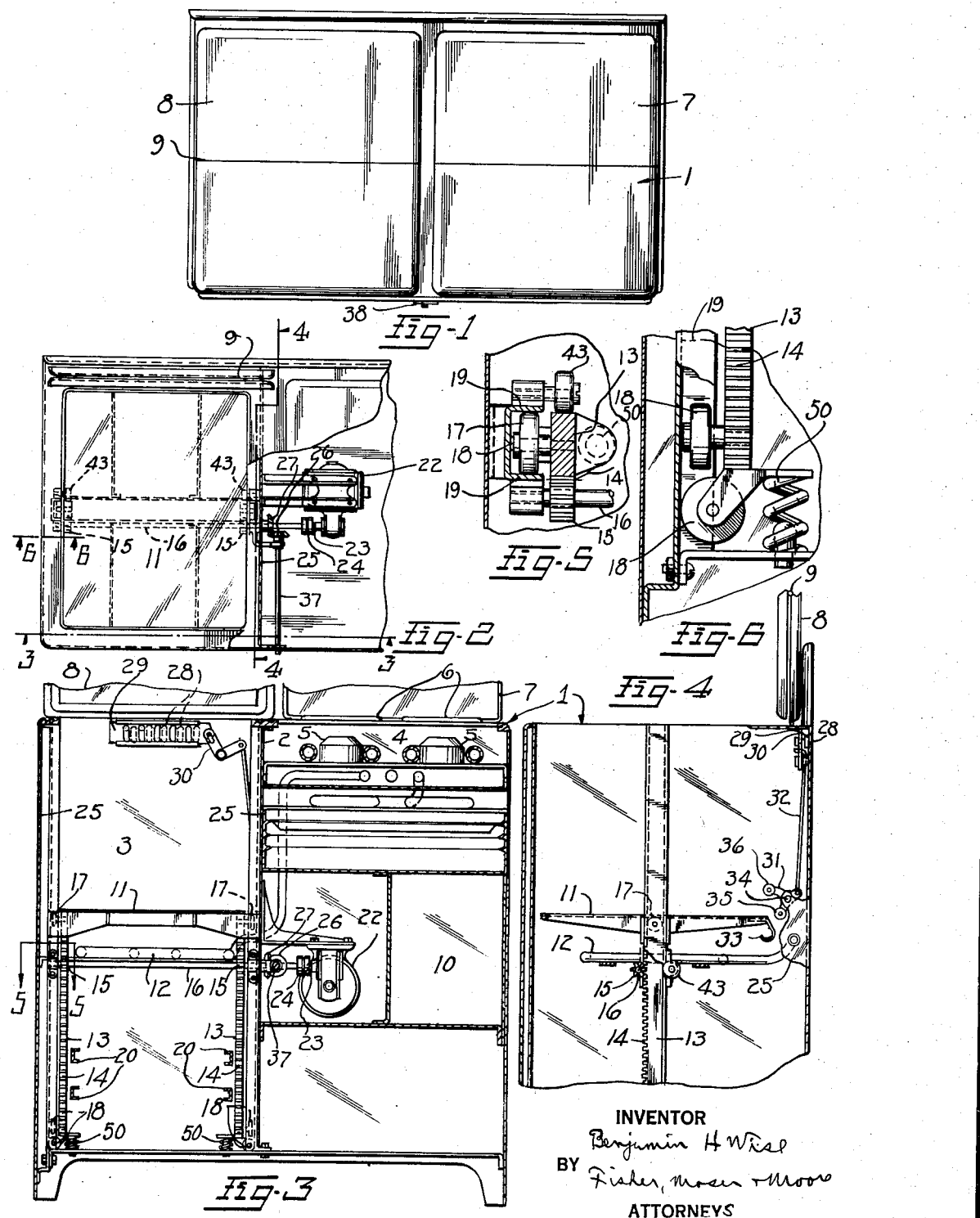

2,163,165

UNITED STATES PATENT OFFICE 2,163,165

STOVE

Benjamin H. Wise, North Olmsted, Ohio

Application June 12, 1937, Serial No. 147,953

2 Claims. (Cl. 126—39)

My invention relates to cooking ranges preferably of the type in which oil or gas fuel is used, however the invention is adaptable for use in cooking ranges employing other kinds of fuel.

It is well known that much energy is expended by housewives in stooping and lifting during the operations of inserting, removing, inspecting and turning roasts and the like, being cooked in ranges of the baking and broiler oven types, and in which the oven burner is positioned in the lower part of the oven.

The general object of the present invention is to provide an oven open at its upper end and provided with a cooking or roasting member or support movable through the open upper end of the oven into a position flush with the top of the stove.

Another object of the invention is to provide a movable roast support which will serve as a working surface for the oven side of the range, when the support is in elevated position.

A further object of the invention is to provide means for automatically venting the hot air from the oven when the roast support is elevated.

Other objects and advantages of the invention will be apparent as the specification is considered in connection with the accompanying drawing, in which:

Figure 1 is a plan view of a stove for accommodating the present invention;

Figure 2 is a fragmentary plan view partly in section showing oven platform, motor and drive gears;

Figure 3 is a sectional view on line 3—3 of Figure 2;

Figure 4 is a sectional view on line 4—4 of Figure 2;

Figure 5 is a sectional view on line 5—5 of Figure 3; and

Figure 6 is a sectional view on line 6—6 of Figure 2.

Referring more particularly to the drawing the numeral 1 denotes a table top type of gas range subdivided by a partition wall 2 into a baking oven section 3 and a top burner section 4, the latter having the usual burners 5, at the top thereof, beneath the grids 6. A two-part cover 7 hinged to the back of the range closes the top burner section 4 when not in use, while a similar two-part cover 8 is provided for the oven section 3, the latter being open at its upper end as indicated at 9 in the drawing. The usual utility compartments 10 are provided in the top burner section. While the section 3 is shown as comprising a baking oven, it is obvious that a swinging burner (not shown) could be employed thus adapting the oven for broiling.

Mounted in the oven 3, for vertical reciprocatory movement is a preferably flat sheet metal member 11 adapted to support a roast or the like above a set of burners 12. Depending from opposite sides of the member 11, intermediate their depth, are a pair of arms 13 the front edges of which are formed with rack teeth 14 for engagement with pinion gears 15, carried by a horizontally disposed shaft 16, extending across the oven 3. Upper and lower guide rollers 17 and 18 respectively, carried by the arms 13, engage behind guide flanges 19 on the side walls 25 of the oven and guide the member 11, as it is being elevated or lowered in a manner presently described. Rollers 43 rotatably supported by the side walls of the oven hold the arms in snug contact with the gears 15. Slides 20 are provided at the sides of the oven for the reception of pans (not shown).

The member 11 can be elevated to a position flush with the top of the stove by means of an electric motor 22, housed within the utility compartment 10 and having its drive shaft 23 connected with the shaft 16, through the medium of a friction clutch 24. When the housewife desires to place a roast or other article of food upon or remove the same from the member 11, it is merely necessary to touch a switch button, not shown, to start the motor 22, or in emergency this operation may be performed manually by means of a crank (not shown) adapted to engage over a stud 37 on a bevel gear 26, meshing with a second beveled gear 27, on the driven shaft 16. When elevated the member 11 will preferably be positioned flush with the top of the stove and consequently in convenient position to permit of roasting pans being removed from or placed on the support 11 without the necessity of bending or stooping. Furthermore, in this position the member 11 can be used as a working surface, or pans containing articles of food can be conveniently slid thereon from the burner section. Any suitable type of two way electric switch 38 is adapted to stop the motor 22 when the member 11 has reached its limit of travel in either direction.

Experience has proven that hot air trapped in the oven causes considerable discomfort to the housewife, when it is permitted to suddenly escape at the front of the stove, as frequently happens when the member 11 is elevated to the top of the stove. To overcome this objection means is provided for venting the hot air through the vent 28 at the rear of the stove. The vent 28 is opened and closed by a sliding damper 29, operated by a bell crank 30, connected to a bifurcated rocker arm 31 by means of a link 32, the rocker arm being pivotally mounted in the path of a contact or trip member 33 attached to the top of member 11, at one side thereof, so that when the member 11 is moved up or down as the case may be, the arm 31 will be rocked on its pivot 34 in an appropriate direction and the vent will be opened or closed, according to the direction in which the member 11 is moving. Thus in down position the bifurcation 35 of the rocker arm is engaged by the trip member 33 which causes the rocker arm to rotate in an anti-clockwise direction and through link 32, and bell crank 30, and to close the damper 29. Conversely, when in elevated position contact 33 engages bifurcation 36 and moves the rocker arm and damper in reverse directions to that just described.

The hinged cover 8 is adapted to be automatically raised by mechanism not shown, when the member 11 approaches the top of the stove. As this mechanism forms no part of the present invention further description thereof is deemed unnecessary.

The movable roast supporting member 11 seats upon a pair of coil springs 50 when the latter has been moved to its lowered position, thus cushioning the shock incident to such movement.

What I claim is:

1. In a stove having a burner section and a top burner therefor, an oven section at one side of said burner section and having an open upper end in a plane with the upper end of said burner section, a movable cover closing the upper open end of the oven section and adapted to be moved in a position to have a free unobstructed space between the open end of the oven section and the burner section, a burner within the lower end of the oven section, a roast support mounted in said oven section above the oven burners and an area approximately equal to that of the open upper end of the oven section, and means operated from without the oven for moving said roast support vertically in said oven section to bring the same in a plane with the upper open end of the oven section and close the same.

2. In a stove having a burner section and a top burner therefor, an oven section at one side of said burner section and having an open upper end in a plane with the upper end of said burner section, a movable cover closing the upper open end of the oven section and adapted to be moved in a position to have a free unobstructed space between the open end of the oven section and the burner section, a burner within the lower end of the oven section, a roast support mounted in said oven section above the oven burners and an area approximately equal to that of the open upper end of the oven section, a damper for venting the upper end of said oven, means operated by the vertical movement of the roast support for opening said damper and means operated from without the oven for moving said roast support vertically in said oven section to bring the same in a plane with the upper open end of the oven section and close the same.

BENJAMIN H. WISE.